United States Patent
Ichinose et al.

(10) Patent No.: US 6,768,277 B2
(45) Date of Patent: Jul. 27, 2004

(54) GAS TURBINE SYSTEM AND METHOD FOR CONTROLLING THE SAME

(75) Inventors: Masaya Ichinose, Hitachiota (JP); Motoo Futami, Hitachiota (JP); Hiroshi Arita, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/102,598

(22) Filed: Mar. 18, 2002

(65) Prior Publication Data

US 2003/0020419 A1 Jan. 30, 2003

(30) Foreign Application Priority Data

Jul. 26, 2001 (JP) ........................................ 2001-226040

(51) Int. Cl.[7] .............................. H02P 7/66; H02P 9/04; F02N 11/04; B60L 11/02

(52) U.S. Cl. ........................ 318/140; 318/147; 318/157; 290/27; 290/36 R; 290/47; 322/14; 322/29; 322/39

(58) Field of Search ................................. 318/140, 142, 318/143, 146, 147, 157, 158, 803, 806; 290/27, 36 R, 40 C, 40 F, 47; 322/14, 15, 16, 25, 29, 39

(56) References Cited

U.S. PATENT DOCUMENTS 5,585,708 A * 12/1996 Richardson et al. ........ 318/803
5,652,485 A * 7/1997 Spiegel et al. ............... 318/147
5,857,349 A * 1/1999 Hamaoka et al. ........... 62/228.4
6,023,135 A 2/2000 Gilbreth et al. ............. 318/140
6,198,240 B1 * 3/2001 Notohara et al. ........... 318/268
6,486,639 B1 * 11/2002 Montret et al. ................ 322/29

FOREIGN PATENT DOCUMENTS

| JP | 09-289776 | 11/1997 | ............ H02M/7/48 |
| JP | 11-356097 | 12/1999 | ............ H02P/9/08 |
| JP | 2000-345952 | 12/2000 | ............ F03D/7/04 |

* cited by examiner

Primary Examiner—Robert Nappi
Assistant Examiner—Edgardo San Martin
(74) Attorney, Agent, or Firm—Hogan & Hartson, LLP

(57) ABSTRACT

In a gas turbine system having first power converter converting power system N AC voltage to DC voltage, second power converter converting the DC voltage into AC voltage, generator connected to second power converter's AC output and rotated by turbine and turbine controller outputting a revolution speed command value omg* according to a fuel flow rate of the turbine, a detector for detects a revolution speed omg of the generator, another detector detects Vdc of the first converter, a speed regulator generates a DC voltage command value according to a difference between omg and omg*, a switchover unit selects either a preset DC voltage command value Vref or the DC voltage command value according to the revolution speed omg and a voltage regulator and a controller control first power converter conversion output according to a control signal for making Vdc coincide with Vdc*.

17 Claims, 5 Drawing Sheets

GAS TURBINE SYSTEM AND METHOD FOR CONTROLLING THE SAME

BACKGROUND OF THE INVENTION

The present invention relates to a gas turbine system for conducting speed control of a generator by using a power conversion apparatus, and relates to its control method.

As an example of a conventional technique for conducting speed control of a generator by using a power conversion apparatus, JP-A-2000-345952 can be mentioned. It relates to wind power generation. A power command value of the power conversion apparatus is computed from the wind velocity. The revolution speed of a generator driven and rotated by a windmill is controlled by pitch control.

In JP-A-9-289776, there is disclosed a technique of computing a speed command of a gas turbine on the basis of an AC load power, controlling a turbine input on the basis of a result of the computation, and thereby regulating a speed of a generator.

In JP-A-11-356097, there is disclosed a technique of providing a speed proportion control section in a fuel control loop, keeping the exhaust gas temperature of a turbine engine at a fixed value, and controlling the gas turbine engine efficiently and stably.

SUMMARY OF THE INVENTION

In the technique disclosed in JP-A-2000-345952 among the conventional techniques, however, speed control is not conducted by control of a power conversion apparatus. In the case where the technique is used in a power conversion apparatus for gas turbine, therefore, the revolution speed is controlled by a mechanical variable such as a fuel flow rate, resulting in slow control. Furthermore, control of the revolution speed using fuel control of the turbine cannot exercise control so as to achieve an optimum revolution speed for the fuel flow rate by itself, resulting in a lowered efficiency.

In the techniques disclosed in JP-A-9-289776 and JP-A-11-356097, the speed of a generator is controlled by controlling a fuel flow rate to a gas turbine. In this case as well, therefore, the revolution speed is controlled by a mechanical variable. In the same way as the technique of JP-A2000-345952, therefore, the control becomes slow and the efficiency is also lowered.

An object of the present invention is to provide a gas turbine system and its control method that make it possible to prevent the control from becoming slow and achieve high efficiency running.

In order to achieve the object, in accordance with an aspect of the present invention, in a gas turbine system including: first power conversion means for converting an AC voltage of a power system to a DC voltage; second power conversion means for converting the DC voltage output from the first power conversion means into an AC voltage; a generator connected to an AC output side of the second power conversion means and driven and rotated by a gas turbine; and turbine control means for outputting a revolution speed command value depending upon a fuel flow rate of the gas turbine, the gas turbine system includes: revolution speed detection means for detecting a revolution speed of the generator; DC voltage detection means for detecting a voltage of a DC side of the first power conversion means; DC voltage command value generation means for generating a DC voltage command value in accordance with a difference between the revolution speed detected by the revolution speed detection means and the revolution speed command value output by the turbine control means; DC voltage command value selection means for selecting either a preset DC voltage command value or the DC voltage command value generated by the DC voltage command value generation means in accordance with the revolution speed detected by the DC voltage detection means; and first control means for controlling a conversion output of the first power conversion means in accordance with a control signal for making the DC voltage detected by the DC voltage detection means coincide with the DC voltage command value selected by the DC voltage command value selection means.

With the configuration, there are no mechanical variables. Accordingly, the control is prevented from being delayed and it becomes possible to run the system at a high efficiency.

In accordance with another aspect of the present invention, the gas turbine system further includes: DC current command value generation means for generating a DC voltage command value in accordance with a difference between the revolution speed detected by the revolution speed detection means and the revolution speed command value output by the turbine control means; running command selection means for selecting either a PWM running command or a diode running command in accordance with the revolution speed detected by the revolution speed detection means; and second control means for controlling a conversion output of the second power conversion means in accordance with the DC voltage command value and the running command selected by the running command selection means. In this case, the running command selection means selects diode rectification running when the detected revolution speed is at least a revolution speed at which such a DC voltage that control on the power system is possible is obtained. The running command selection means selects PWM running when the detected revolution speed is less than the revolution speed at which such a DC voltage that control on the power system is possible is obtained.

In accordance with another aspect of the present invention, in a power conversion apparatus including: first power conversion means for converting an AC voltage of a power system to a DC voltage; and second power conversion means for converting the DC voltage output from the first power conversion means into an AC voltage, a generator driven and rotated by a gas turbine being connected to an AC output side of the second power conversion means, the power conversion apparatus includes: revolution speed detection means for detecting a revolution speed of the generator; DC voltage detection means for detecting a voltage of a DC side of the first power conversion means; DC voltage command value generation means for generating a DC voltage command value in accordance with a difference between the revolution speed detected by the revolution speed detection means and a revolution speed command value depending upon a fuel flow rate of the gas turbine; DC voltage command value selection means for selecting either a preset DC voltage command value or the DC voltage command value generated by the DC voltage command value generation means in accordance with the revolution speed detected by the DC voltage detection means; and first control means for controlling a conversion output of the first power conversion means in accordance with a control signal for making the DC voltage detected by the DC voltage detection means coincide with the DC voltage command value selected by the DC voltage command value selection means.

In accordance with another aspect of the present invention, in a control method of a gas turbine system including: first power conversion means for converting an AC voltage of a power system to a DC voltage; second power conversion means for converting the DC voltage output from the first power conversion means into an AC voltage; a generator connected to an AC output side of the second power conversion means and driven and rotated by a gas turbine; and turbine control means for outputting a revolution speed command value depending upon a fuel flow rate of the gas turbine, the gas turbine system control method includes the steps of: providing revolution speed detection means for detecting a revolution speed of the generator, and DC voltage detection means for detecting a voltage of a DC side of the first power conversion means; generating a DC voltage command value in accordance with a difference between the revolution speed detected by the revolution speed detection means and the revolution speed command value output by the turbine control means; selecting either a preset DC voltage command value or the generated DC voltage command value in accordance with the revolution speed detected by the DC voltage detection means; and controlling a conversion output of the first power conversion means in accordance with a control signal for making the DC voltage detected by the DC voltage detection means coincide with the selected DC voltage command value.

Other objects, features and advantages of the invention will become apparent from the following description of the embodiments of the invention taken in conjunction with the accompanying drawings.

DESCRIPTION OF THE EMBODIMENTS

Figure 1:
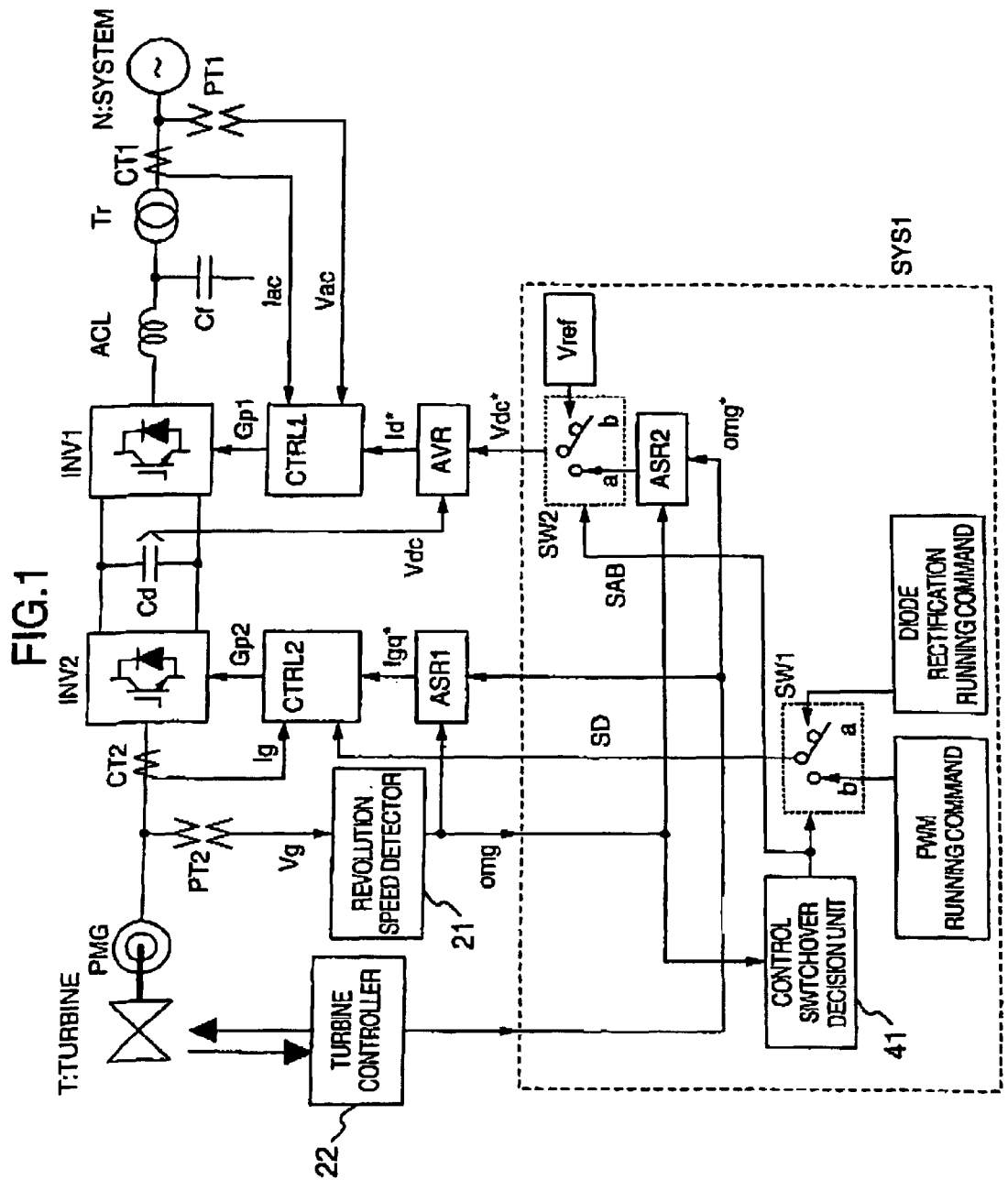
FIG. 1 is a general configuration diagram of a gas turbine system according to a first embodiment of the present invention.

Hereafter, embodiments of the present invention will be described by referring to the drawings.
(First Embodiment)
FIG. 1 shows a general configuration of a gas turbine system according to a first embodiment of the present invention. In FIG. 1, a three-phase AC output of a power converter INV1 is coupled to a power system N via a reactor ACL, a capacitor Cf, and a linking transformer Tr. A capacitor Cd of a DC section of a first power converter INV1 is connected to a DC section of a second power converter INV2. An AC output of the second power converter INV2 is connected to a permanent magnet generator PMG. A rotor of the generator PMG receives a torque from a turbine T. The input torque is converted to power by the generator PMG. The power is output to the power system N via the second power converter INV2 and the first power converter INV1. A current detector CT1 and a voltage detector PT1 are attached to an output line of the linking transformer Tr. The current detector CT1 detects a linking point current Iac, and the voltage detector PT1 detects a linking point Vac.

A converter controller CTRL1 is connected to the first power converter INV1. In addition, a DC voltage regulator AVR is connected to the converter controller CTRL1. The DC voltage regulator AVR computes an active component current command value Id* so as to make a DC voltage command value Vdc* output from a switchover unit SW2 described later coincide with a DC voltage Vdc of the capacitor Cd. The DC voltage regulator AVR outputs the active component current command value Id* to the converter controller CTRL1. On the basis of the active component current command value Id*, the converter controller CTRL1 outputs gate pulses Gp1 to the first power converter INV1 on the basis of the active component current command value Id*. Although not illustrated, a DC voltage detector for detecting the DC voltage Vdc is provided for the capacitor Cd.

Figure 2:
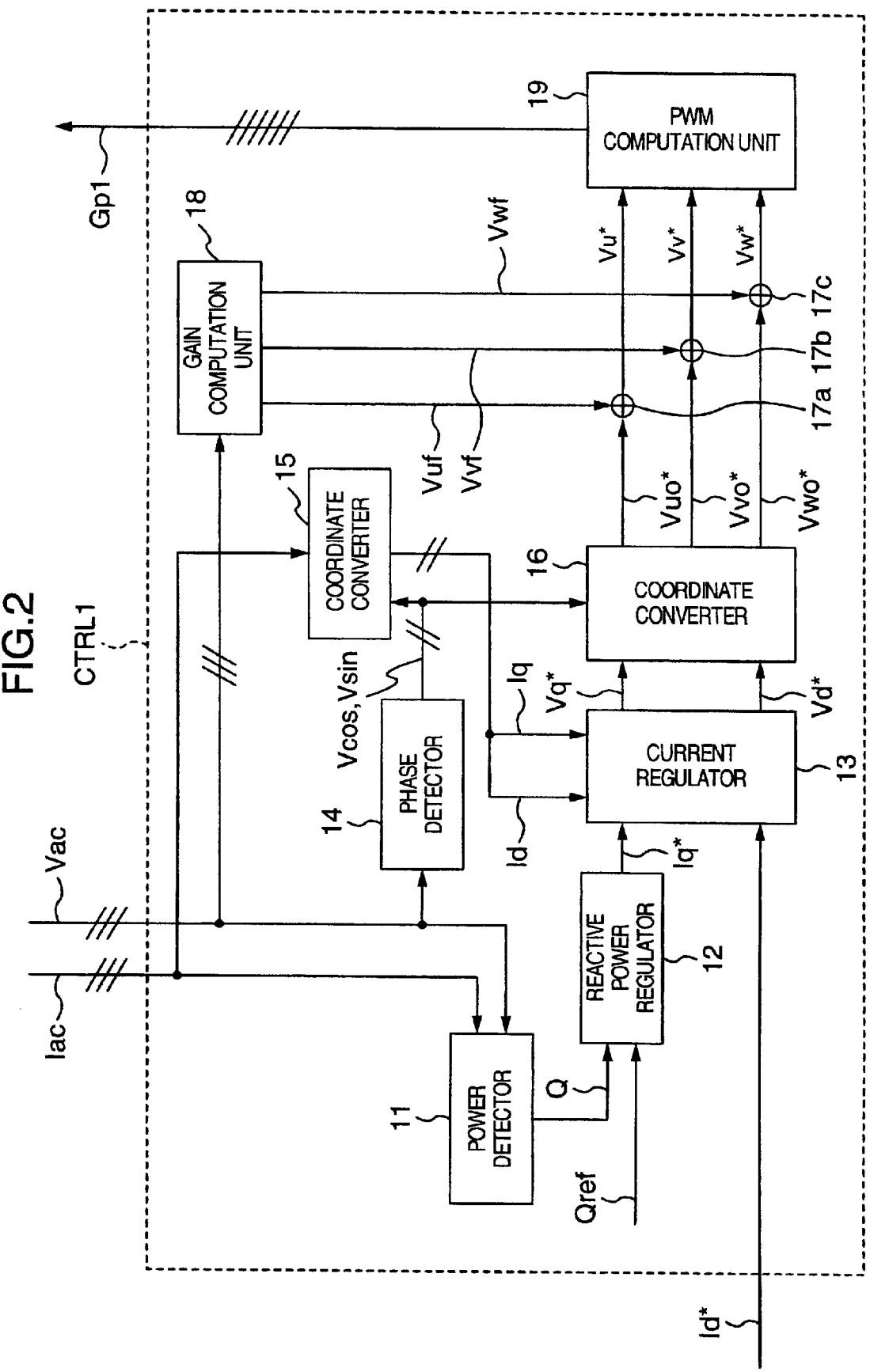
FIG. 2 is an internal configuration diagram of a converter controller CTR1 shown in FIG. 1.

FIG. 2 shows a detailed configuration of the converter controller CTRL1. As shown in FIG. 2, the converter controller CTRL1 includes a power detector 11, a reactive power regulator 12, a phase detector 14, coordinate converters 15 and 16, adders 17a, 17b, and 17c, a gain computation unit 18, and a PWM computation unit 19.

The power detector 11 computes reactive power Q to be output to the power system N, on the basis of the linking point current Iac supplied from the current detector CT1 and the linking point voltage Vac supplied from the voltage detector PT1. The reactive power Q obtained as a computation result is input to the reactive power regulator 12. The reactive power regulator 12 computes a reactive current command value Iq* so as to make the reactive power Q coincide with a reactive power command value Qref. The reactive current command value Iq* computed in the reactive power regulator 12 is input to the current regulator 13 together with the active component current command value Id* output from the DC voltage regulator AVR.

The linking point voltage Vac supplied from the voltage detector PT1 is input to the phase detector 14 as well. The phase detector 14 outputs phase signals Vcos and Vsin that follow the phase of the linking point voltage Vac. These phase signals Vcos and Vsin are input to the coordinate converters 15 and 16. The linking point current Iac supplied from the current detector CT1 is input to the coordinate converter 15 as well. The coordinate converter 15 conducts coordinate conversion on the linking point current Iac, and input two-axis resultant current detection values Id and Iq to the current regulator 13. The current regulator 13 exercises control so as to make the currents Id and Iq of the first power converter INV1 coincide with the active component current command value Id* and the reactive current command value Iq*, respectively. Outputs Vd* and Vq* of the current regulator 13 are input to the coordinate converter 16. The coordinate converter 16 outputs voltage command values Vuo*, Vvo* and Vwo* to the adders 17a, 17b and 17c, respectively.

The linking point voltage Vac supplied from the voltage detector PT1 is input to the gain computation unit 18 as well. The gain computation unit 18 regulates magnitudes of respective phases, computes feedforward voltage command values Vuf, Vvf and Vwf to the adders 17a, 17b and 17c, respectively.

The adders 17a, 17b and 17c add the voltage command values Vuo*, Vvo* and Vwo* to the feedforward voltage command values Vuf, Vvf and Vwf, respectively, and output the voltage command values Vu*, Vv* and Vw* of the power converter obtained as results of the addition to the PWM computation unit 19. And the PWM computation unit 19 outputs gate pulses Gp1 based on the voltage command values Vu*, Vv* and Vw* of the power converter to the first power converter INV1.

A converter controller CTRL2 is connected to the second power converter INV2 as shown in FIG. 1. In addition, a speed regulator ASR1 is connected to the converter controller CTRL2. A voltage detector PT2 is provided on the AC output side of the second power converter INV2. A generator voltage (three-phase AC voltage) Vg of the generator PMG detected by the voltage detector PT2 is input to a revolution speed detector 21. The revolution speed detector 21 detects a revolution speed of the generator PMG from the generator voltage Vg. A revolution speed detection value omg obtained as a result of the detection is input to the speed regulator ASR1. A speed command value omg* of the generator PMG is input from a turbine controller 22 to the speed regulator ASR1. The speed regulator ASR1 computes a torque component current command value Igq* so as to make the revolution speed detection value omg coincide with the speed command value omg* of the generator PMG. The torque component current command value Igq* thus computed is input to the converter controller CTRL2. A current detector CT2 for detecting a three-phase current Ig output from the generator PMG is provided on the AC output side of the second power converter INV2.

Figure 3:
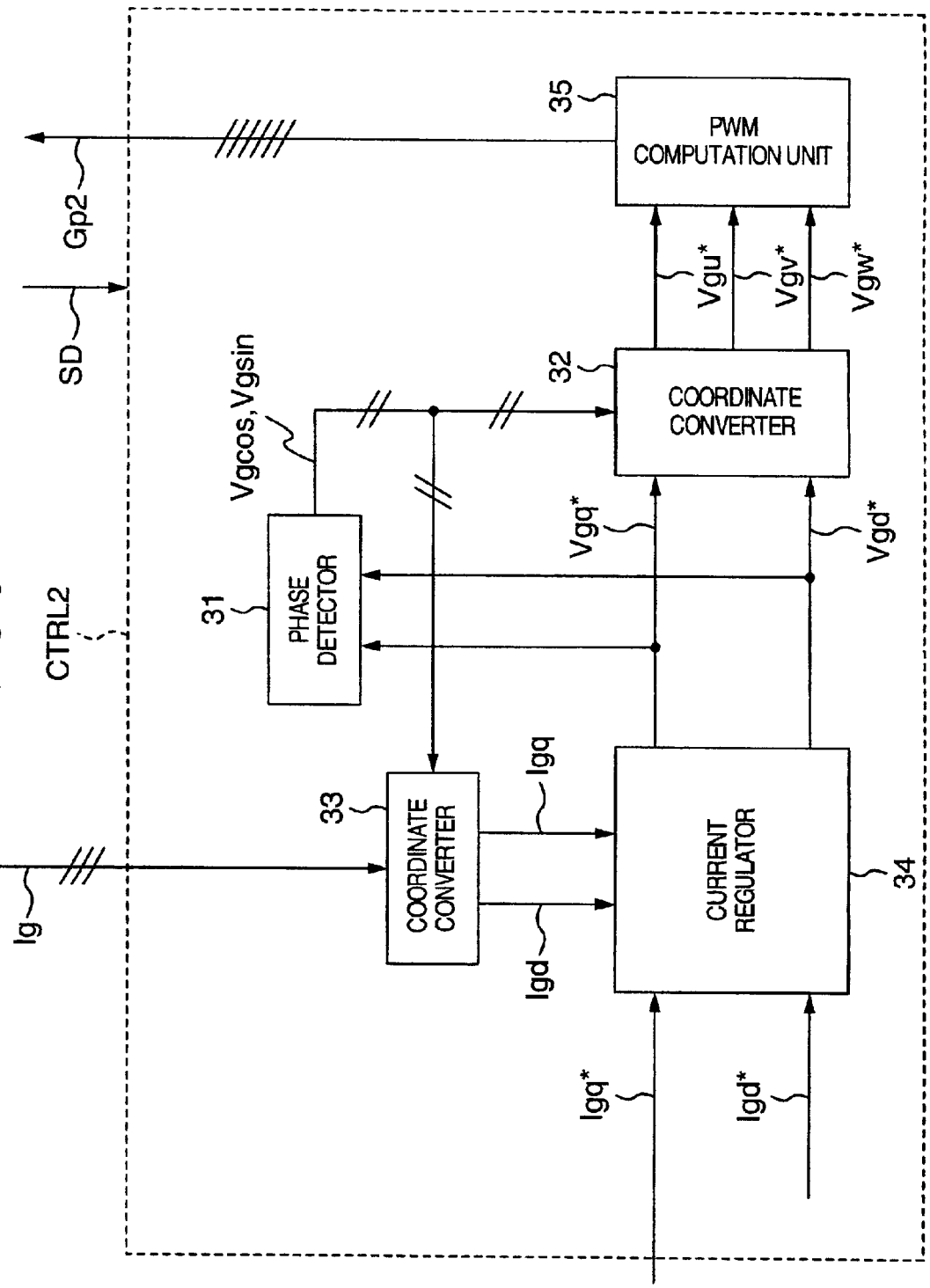
FIG. 3 is an internal configuration diagram of a converter controller CTR2 shown in FIG. 1.

FIG. 3 shows a detailed configuration of the converter controller CTRL2. As shown in FIG. 3, the converter controller CTRL2 includes a phase detector 31, coordinate converters 32 and 33, a current regulator 34, and a PWM computation unit 35.

In order to generate phase signals that follow the phase of the generator voltage Vg, the phase detector 31 outputs phase signals Vgcos and Vgsin by using voltage command values Vgd* and Vgq* output from the current regulator 34. The phase signals Vgcos and Vgsin are input to the coordinate converter 32. The current Ig of the generator PMG detected by the current detector CT2 is input to the coordinate converter 33. The coordinate converter 33 conducts coordinate conversion on the current Ig, and two-axis current detection values Igd and Igq obtained as a result of the conversion to the current regulator 34. The current regulator 34 controls the current of the power converter so as to make the currents of the power converter coincide with command values Igd* and Igq*. The outputs of the current regulator 34 are input to the coordinate converter 32. The coordinate converter 32 outputs voltage command values Vgu*, Vgv* and Vgw* to the PWM computation unit 35. And the PWM computation unit 35 outputs gate pulses Gp2 based on the voltage command values Vgu*, Vgv* and Vgw* of the power converter to the power converter INV2.

The turbine controller 22 shown in FIG. 1 controls a fuel flow rate of the turbine T, computes therein power that can be output depending on the current fuel flow rate, finds a revolution speed of the generator PMG meeting the computed power by referring to, for example, a predetermined internal table, and outputs the revolution speed command value omg* to a system controller SYS1.

As shown in FIG. 1, the system controller SYS1 includes a control switchover decision unit 41, switchover switches SW1 and SW2, and a speed regulator ASR2.

The revolution speed command value omg* supplied from the turbine controller 22 and the revolution speed detection value omg supplied from the revolution speed detector 21 are input to the system controller SYS1. The revolution speed command value omg* is input to the speed regulator ASR2, and used as the speed command value. The revolution speed detection value omg is input to the control switchover decision unit 41 and the speed regulator ASR2. The control switchover decision unit 41 supplied with the revolution speed detection value omg outputs a switchover signal SAB to switchover units SW1 and SW2.

When the switchover signal SAB is "b", the switchover unit SW1 outputs a PWM running command for using the gate pulses to the converter controller CTRL2 as a signal SD. When the switchover signal SAB is "a", the switchover unit SW1 outputs a diode rectification running command to the converter controller CTRL2 as the signal SD in command to turn off all gate pulses and make the power converter INV2 to conduct diode rectification operation.

When the switchover signal SAB is "b", the switchover unit SW2 outputs a fixed value Vref to the DC voltage regulator AVR as the voltage command value Vdc*. When the switchover signal SAB is "a", an output of the speed regulator ASR2 is used as the voltage command value Vdc*.

In the present embodiment, the first power converter INV1 forms the first power conversion means or converter, and the second power converter INV2 forms the second power conversion means or converter. The turbine controller 22 forms the turbine control means or controller, and the revolution speed detector 21 forms the revolution speed detection means or detector. The speed regulator ASR2 forms the DC voltage command value generation means or generating unit, and the switchover unit SW2 forms the DC voltage command value selection means or selector. The DC voltage regulator AVR and the converter controller CTRL1 form the first control means or controller.

The speed regulator ASR1 forms the DC current command value generation means or generating unit, and the switchover unit SW1 forms the running command selection means or selector. The converter controller CTRL2 forms the second control means or controller.

Figure 4:
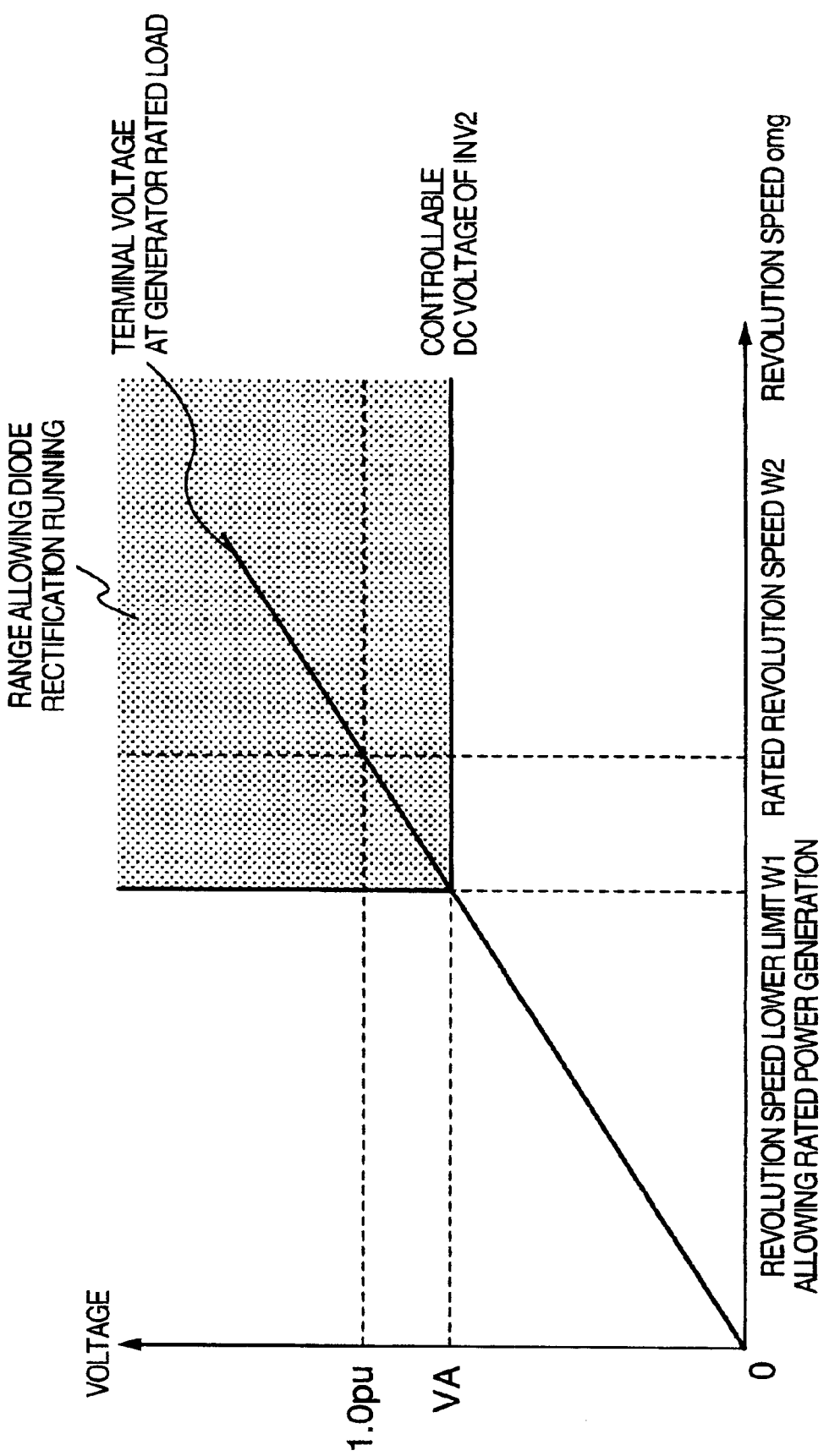
FIG. 4 is a diagram showing operation of the gas turbine system shown in FIG. 1.

FIG. 4 is a diagram showing operation of the control switchover decision unit 41. In FIG. 4, the abscissa indicates the revolution speed omg of the generator PMG, and the ordinate indicates the voltage. In FIG. 4, the voltage VA of the ordinate is an AC voltage value corresponding to a DC voltage Vdcn at which the first power converter INV1 can control the power of the system. By using the following equation (1), the DC voltage Vdcn can be found from a phase voltage root-mean-square vcalue Vinv of the converter side of the transformer Tr to which the power converter INV1 is coupled.

$$Vdcn = sqrt(2) \times Vinv \times 2 \qquad (1)$$

Induced voltage of the generator PMG rises in proportion to the revolution speed. When the revolution speed is larger than a revolution speed W1 at which the DC voltage Vdcn is obtained, therefore, a DC voltage of at least Vdcn is obtained even if the second power converter INV2 conducts diode rectification running. Therefore, the control switchover decision unit 41 outputs "a" as the switchovr signal SAB in such a range that the revolution speed is larger than W1 inclusive of a rated running point. Otherwise, the control switchover decision unit 41 outputs "b." At this time, the region where the switchover signal is "a" becomes a region where the speed of the generator is controlled by varying the DC voltage of the converter.

In the example of FIG. 4, the second power converter INV2 conducts diode rectification running when the revolution speed is larger than W1 at which the DC voltage Vdcn is obtained. Alternatively, switchover to the diode rectification running may be confined to only the vicinity of the rating. When the revolution speed is lower than the rating, the PWM running is continued and the DC voltage is controlled to assume a value that approximately coincides with the DC voltage Vdcn at which the first power converter INV1 can control power to the system, such as, for example, a value lower than a DC voltage value charged from the generator at the time of diode rectification running.

According to the present embodiment, the power converter INV2 of the generator side includes means for coonducting switching between the PWM running using the gate pulses and the diode rectification running. As a result, the switching loss of the power converter at the time of diode running can be reduced.

According to the present embodiment, the converter control of the system coupling side includes speed control of the generator PMG, and the power output from the generator PMG to the system N is regulated by varying the DC command value. As a result, the speed control of the generator PMG becomes possible, even if the power converter INV2 of the generator side is switched to the diode rectification running.

According to the present embodiment, the speed control is possible at the time of the diode rectification running. Accordingly, it is possible to exercise control so as to achieve the most efficient revolution speed (optimum fuel flow rate, i.e., optimum revolution speed) of the turbine T. As a result, it becomes possible to increase the efficiency of the turbine side, and the efficiency of the whole system can be further improved.

According to the present embodiment, switchover to the diode rectification running is conducted when the revolution speed is high in the vicinity of the rating, and the PWM running is continued and the DC voltage is controlled to become a value lower than the rating when the revolution speed is lower than the switchover point. As a result, the loss of the power converter and the generator at the time of low revolution speed can be reduced.

(Second Embodiment)

Figure 5:
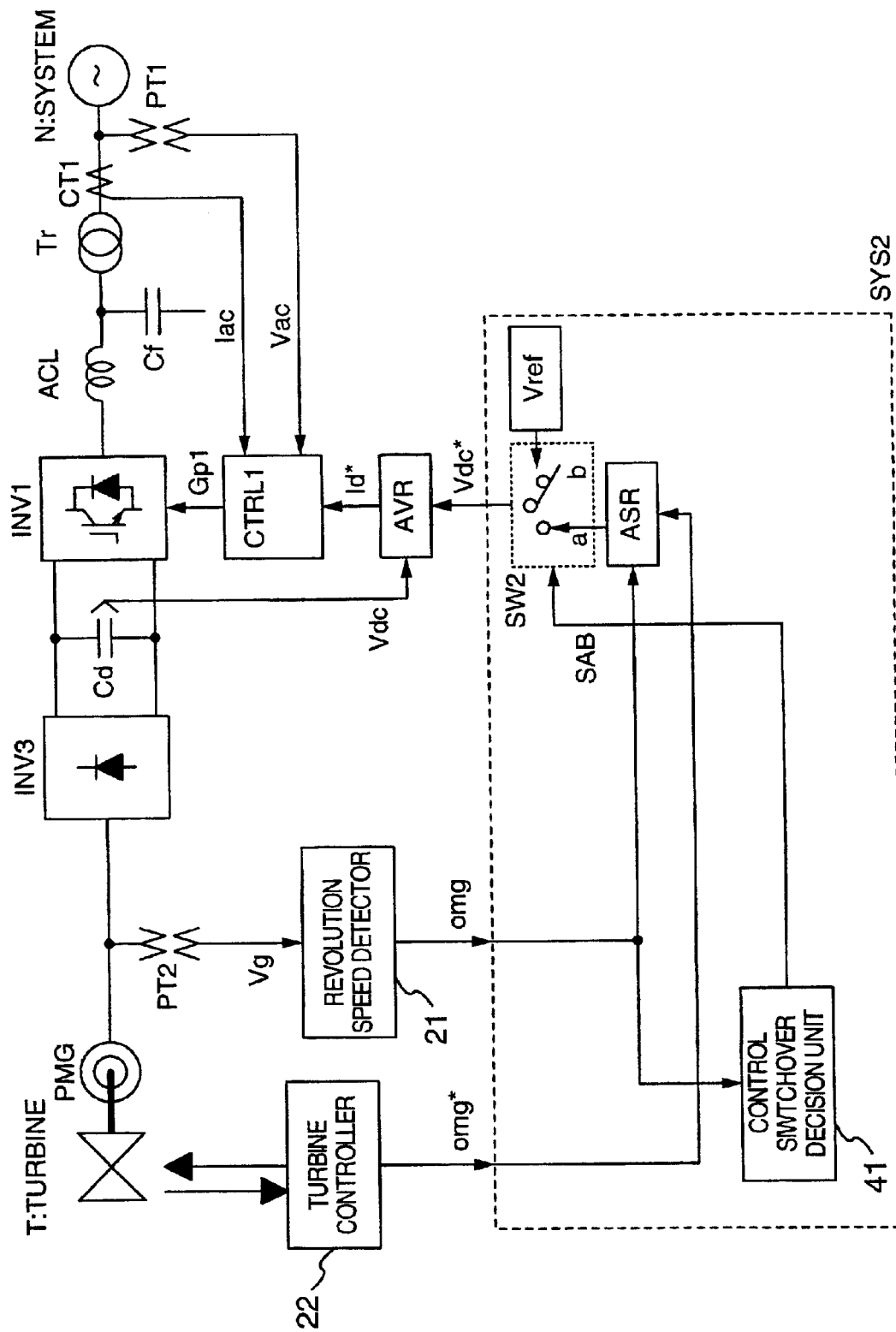
FIG. 5 is a general configuration diagram of a gas turbine system according to a second embodiment of the present invention.

FIG. 5 shows a second embodiment of the present invention. In the present embodiment, a third power converter INV3 is provided instead of the second power converter INV2 in the first embodiment. Furthermore, equivalents for the converter controller CTRL2 and the speed regulator ARS2 are not provided. In addition, the control switchover decision unit 41 and the switchover unit SW2 are provided in a system controller SYS2. An equivalent for the switchover unit SW1 in the first embodiment is not provided. The configuration of the remaining parts is the same as that of the first embodiment.

The third power converter INV3 differs in configuration from the second power converter INV2 of the first embodiment, and uses a diode rectifier. In the case where it is not necessary to control the generator PMG at a low revolution speed in the converter, such as the case where self-start is not necessary, the configuration of the present embodiment is more suitable.

According to the present embodiment, a diode rectifier is used in the converter of the generator side. As a result, the configuration is simplified and cost reduction becomes possible.

As heretofore described, according to the embodiments, the control is prevented from being delayed and it becomes possible to run gas turbine systems at high efficiency.

It should be further understood by those skilled in the art that the foregoing description has been made on embodiments of the invention and that various changes and modifications may be made in the invention without departing from the spirit of the invention and the scope of the appended claims.

What is claimed is:

1. A gas turbine system including: first power conversion means for converting an AC voltage of a power system to a DC voltage; second power conversion means for converting the DC voltage output from said first power conversion means into an AC voltage; a generator connected to an AC output side of said second power conversion means and driven and rotated by a gas turbine; and turbine control means for outputting a revolution speed command value depending upon a fuel flow rate of said gas turbine, said gas turbine system comprising:

revolution speed detection means for detecting a revolution speed of said generator;

DC voltage detection means for detecting a voltage of a DC side of said first power conversion means;

DC voltage command value generation means for generating a DC voltage command value in accordance with a difference between the revolution speed detected by said revolution speed detection means and the revolution speed command value output by said turbine control means;

DC voltage command value selection means for selecting either a preset DC voltage command value or the DC voltage command value generated by said DC voltage command value generation means in accordance with the revolution speed detected by said DC voltage detection means; and first control means for controlling a conversion output of said first power conversion means in accordance with a control signal for making the DC voltage detected by said DC voltage detection means coincide with the DC voltage command value selected by said DC voltage command value selection means.

2. The gas turbine system according to claim 1, comprising:

DC current command value generation means for generating a DC voltage command value in accordance with a difference between the revolution speed detected by said revolution speed detection means and the revolution speed command value output by said turbine control means;

running command selection means for selecting either a PWM running command or a diode running command in accordance with the revolution speed detected by said revolution speed detection means; and second control means for controlling a conversion output of said second power conversion means in accordance with the DC voltage command value and the running command selected by said running command selection means.

3. The gas turbine system according to claim 2, wherein said running command selection means selects diode rectification running when the detected revolution speed is at least a revolution speed at which such a DC voltage that control on the power system is possible is obtained, and said running command selection means selects PWM running when the detected revolution speed is less than the revolution speed at which such a DC voltage that control on the power system is possible is obtained.

4. A power conversion apparatus including: first power conversion means for converting an AC voltage of a power system to a DC voltage; and second power conversion means for converting the DC voltage output from said first power conversion means into an AC voltage, a generator driven and rotated by a gas turbine being connected to an AC output side of said second power conversion means, said power conversion apparatus comprising:

revolution speed detection means for detecting a revolution speed of said generator;

DC voltage detection means for detecting a voltage of a DC side of said first power conversion means;

DC voltage command value generation means for generating a DC voltage command value in accordance with a difference between the revolution speed detected by said revolution speed detection means and a revolution speed command value depending upon a fuel flow rate of said gas turbine;

DC voltage command value selection means for selecting either a preset DC voltage command value or the DC voltage command value generated by said DC voltage command value generation means in accordance with the revolution speed detected by said DC voltage detection means; and first control means for controlling a conversion output of said first power conversion means in accordance with a control signal for making the DC voltage detected by said DC voltage detection means coincide with the DC voltage command value selected by said DC voltage command value selection means.

5. The power conversion apparatus according to claim 4, comprising:

DC current command value generation means for generating a DC voltage command value in accordance with a difference between the revolution speed detected by said revolution speed detection means and the revolution speed command value depending upon the fuel flow rate of said gas turbine;

running command selection means for selecting either a PWM running command or a diode running command in accordance with the revolution speed detected by said revolution speed detection means; and second control means for controlling a conversion output of said second power conversion means in accordance with the DC voltage command value and the running command selected by said running command selection means.

6. The power conversion apparatus according to claim 5, wherein said running command selection means selects diode rectification running when the revolution speed detected by said revolution speed detection means is at least a revolution speed at which such a DC voltage that control on the power system is possible is obtained, and said running command selection means selects PWM running when the revolution speed detected by said revolution speed detection means is less than the revolution speed at which such a DC voltage that control on the power system is possible is obtained.

7. A control method of a gas turbine system including: first power conversion means for converting an AC voltage of a power system to a DC voltage; second power conversion means for converting the DC voltage output from said first power conversion means into an AC voltage; a generator connected to an AC output side of said second power conversion means and driven and rotated by a gas turbine; and turbine control means for outputting a revolution speed command value depending upon a fuel flow rate of said gas turbine, said gas turbine system control method comprising the steps of:

providing revolution speed detection means for detecting a revolution speed of said generator, and DC voltage detection means for detecting a voltage of a DC side of said first power conversion means;

generating a DC voltage command value in accordance with a difference between the revolution speed detected by said revolution speed detection means and the revolution speed command value output by said turbine control means;

selecting either a preset DC voltage command value or the generated DC voltage command value in accordance with the revolution speed detected by said DC voltage detection means; and controlling a conversion output of said first power conversion means in accordance with a control signal for making the DC voltage detected by said DC voltage detection means coincide with the selected DC voltage command value.

8. The gas turbine system control method according to claim 7, comprising the steps of:

generating a DC voltage command value in accordance with a difference between the revolution speed detected by said revolution speed detection means and the revolution speed command value output by said turbine control means;

selecting either a PWM running command or a diode running command in accordance with the revolution speed detected by said revolution speed detection means; and controlling a conversion output of said second power conversion means in accordance with the DC voltage command value and the selected running command.

9. The gas turbine system control method according to claim 8, wherein diode rectification running is selected when the detected revolution speed is at least a revolution speed at which such a DC voltage that control on the power system is possible is obtained, and PWM running is selected when the detected revolution speed is less than the revolution speed at which such a DC voltage that control on the power system is possible is obtained.

10. The gas turbine system control method according to claim 8, wherein at time of the PWM running, the DC voltage of said first power conversion means is controlled to become a low value in a range of the DC voltage at which control is possible, and switchover to the diode rectification running is conducted in a region where the revolution speed of said generator is high.

11. The gas turbine system control method according to claim 9, wherein at time of the PWM running, the DC voltage of said first power conversion means is controlled to become a low value in a range of the DC voltage at which control is possible, and switchover to the diode rectification running is conducted in a region where the revolution speed of said generator is high.

12. A gas turbine system including: first power converter for converting an AC voltage of a power system to a DC voltage; second power converter for converting the DC voltage output from said first power converter into an AC voltage; a generator connected to an AC output side of said second power converter and driven and rotated by a gas turbine; and turbine controller for outputting a revolution speed command value depending upon a fuel flow rate of said gas turbine, said gas turbine system comprising:

revolution speed detector for detecting a revolution speed of said generator;

DC voltage detector for detecting a voltage of a DC side of said first power convertor;

DC voltage command value generator for generating a DC voltage command value in accordance with a difference between the revolution speed detected by said revolution speed detector and the revolution speed command value output by said turbine controller;

DC voltage command value selector for selecting either a preset DC voltage command value or the DC voltage command value generated by said DC voltage command value generator in accordance with the revolution speed detected by said DC voltage detector; and first controller for controlling a conversion output of said first power converter in accordance with a control signal for making the DC voltage detected by said DC voltage detector coincide with the DC voltage command value selected by said DC voltage command value selector.

13. The gas turbine system according to claim 12, comprising:

DC current command value generating unit for generating a DC voltage command value in accordance with a difference between the revolution speed detected by said revolution speed detector and the revolution speed command value output by said turbine controller;

running command selection means for selecting either a PWM running command or a diode running command in accordance with the revolution speed detected by said revolution speed detector; and second controller for controlling a conversion output of said second power converter in accordance with the DC voltage command value and the running command selected by said running command selector.

14. The gas turbine system according to claim 13, wherein said running command selector selects diode rectification running when the detected revolution speed is at least a revolution speed at which such a DC voltage that control on the power system is possible is obtained, and said running command selector selects PWM running when the detected revolution speed is less than the revolution speed at which such a DC voltage that control on the power system is possible is obtained.

15. A power conversion apparatus including: first power converter for converting an AC voltage of a power system to a DC voltage; and second power converter for converting the DC voltage output from said first power converter into an AC voltage, a generator driven and rotated by a gas turbine being connected to an AC output side of said second power converter, said power conversion apparatus comprising:

revolution speed detector for detecting a revolution speed of said generator;

DC voltage detector for detecting a voltage of a DC side of said first power converter;

DC voltage command value generating unit for generating a DC voltage command value in accordance with a difference between the revolution speed detected by said revolution speed deteceter and a revolution speed command value depending upon a fuel flow rate of said gas turbine;

DC voltage command value selector for selecting either a preset DC voltage command value or the DC voltage command value generated by said DC voltage command value generating unit in accordance with the revolution speed detected by said DC voltage detector; and first controller for controlling a conversion output of said first power convertor in accordance with a control signal for making the DC voltage detected by said DC voltage detector coincide with the DC voltage command value selected by said DC voltage command value selector.

16. The power conversion apparatus according to claim 15, comprising:

DC current command value generating unit for generating a DC voltage command value in accordance with a difference between the revolution speed detected by said revolution speed detector and the revolution speed command value depending upon the fuel flow rate of said gas turbine;

running command selector for selecting either a PWM running command or a diode running command in accordance with the revolution speed detected by said revolution speed detector; and second controller for controlling a conversion output of said second power converter in accordance with the DC voltage command value and the running command selected by said running command selector.

17. The power conversion apparatus according to claim 16, wherein said running command selector selects diode rectification running when the revolution speed detected by said revolution speed detector is at least a revolution speed at which such a DC voltage that control on the power system is possible is obtained, and said running command selector selects PWM running when the revolution speed detected by said revolution speed detector is less than the revolution speed at which such a DC voltage that control on the power system is possible is obtained.

* * * * *